United States Patent [19]

Frost et al.

[11] Patent Number: 5,367,442
[45] Date of Patent: Nov. 22, 1994

[54] SELF-CONTAINED SOLAR POWERED LAMP

[75] Inventors: John S. Frost; David P. Tanner, both of Thousand Oaks; Kimberly E. Seegan, Agoura, all of Calif.

[73] Assignee: Siemens Solar Industries L.P., Camarillo, Calif.

[21] Appl. No.: 963,930

[22] Filed: Oct. 19, 1992

Related U.S. Application Data

[63] Continuation of Ser. No. 622,455, Dec. 5, 1990, abandoned, which is a continuation-in-part of Ser. No. 392,694, Aug. 11, 1989, Pat. No. 5,062,028.

[51] Int. Cl.$^5$ .............................. F21S 9/02; F21V 29/00
[52] U.S. Cl. .................................... 362/183; 362/294; 362/373
[58] Field of Search ............... 362/153.1, 183, 294, 362/373, 431

[56] References Cited

U.S. PATENT DOCUMENTS

| | | | |
|---|---|---|---|
| 4,441,143 | 4/1984 | Rihcardson, Jr. | 362/183 |
| 4,600,979 | 7/1986 | Fisher et al. | 362/294 |
| 4,751,622 | 6/1988 | Williams | 362/183 |
| 4,772,990 | 9/1988 | Linenan et al. | 362/183 |
| 4,800,475 | 1/1989 | Panagiotou | 362/294 |
| 4,843,525 | 6/1989 | Williams | 362/183 |
| 4,999,060 | 3/1991 | Szekely et al. | 362/183 |
| 5,003,441 | 3/1991 | Crowe et al. | 362/183 |
| 5,055,984 | 10/1991 | Hung et al. | 362/183 |
| 5,086,267 | 2/1992 | Sanda et al. | 362/183 |

FOREIGN PATENT DOCUMENTS

WO80/01712  8/1980  WIPO .

OTHER PUBLICATIONS

Two Photographs of a light called "Walklite" made by Chronar, no date.

*Primary Examiner*—Richard R. Cole

[57] ABSTRACT

A solar powered lamp configured to function more efficiently at elevated temperatures. The solar powered lamp comprises an electrical storage device disposed in heat transfer proximity to a solar cell array. The electrical storage device is adapted to increase its acceptance of charge, provided by the solar cell array, at elevated temperatures. The solar powered lamp is also configured to permit flow of air through the lamp and to be assembled and disassembled with ease.

34 Claims, 9 Drawing Sheets

FIG. 2
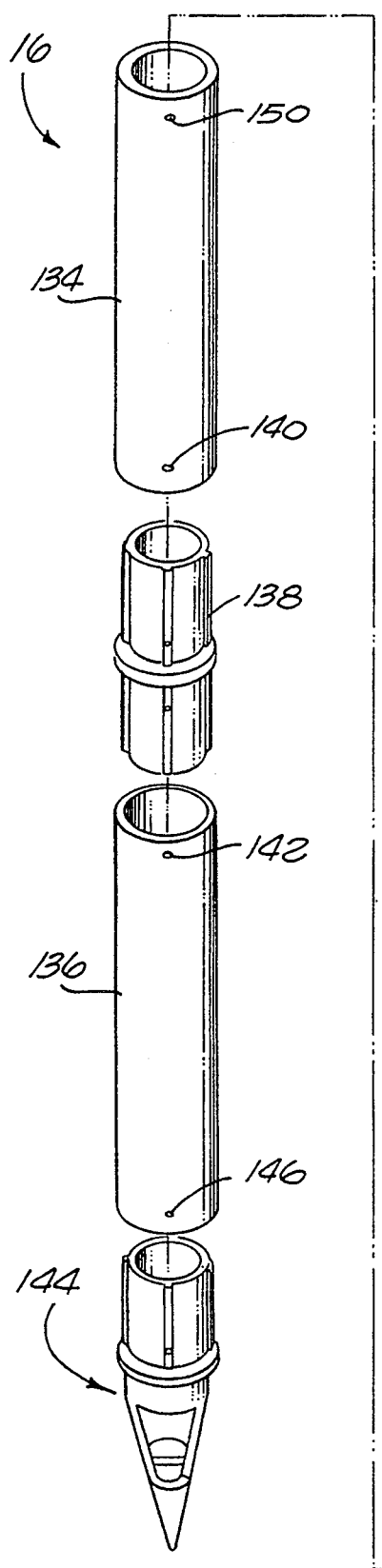
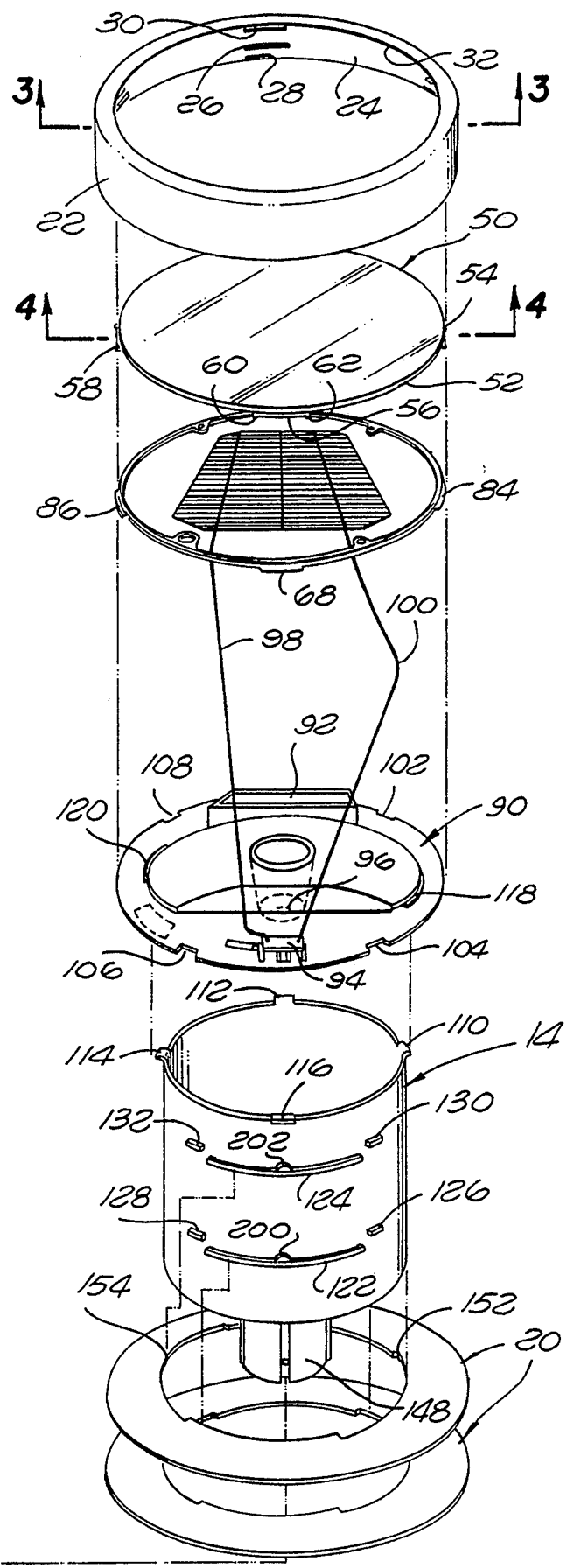

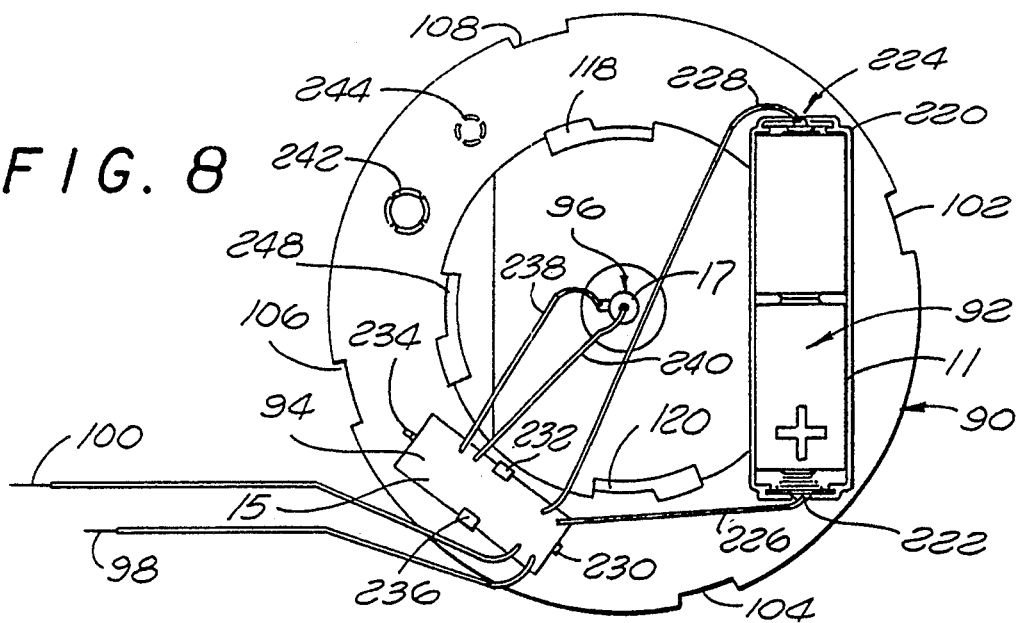
FIG. 8
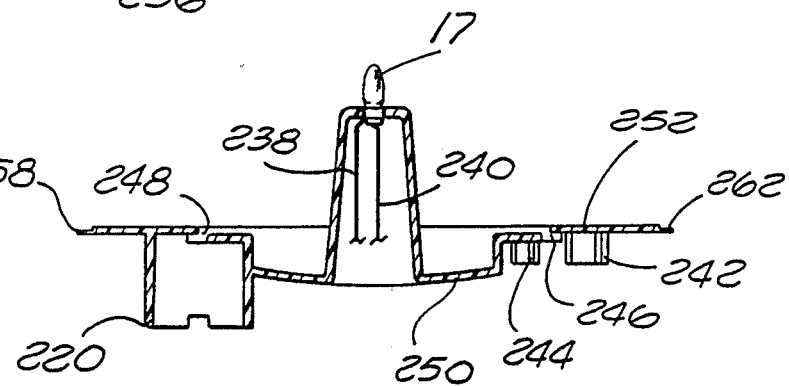
FIG. 9
FIG. 10

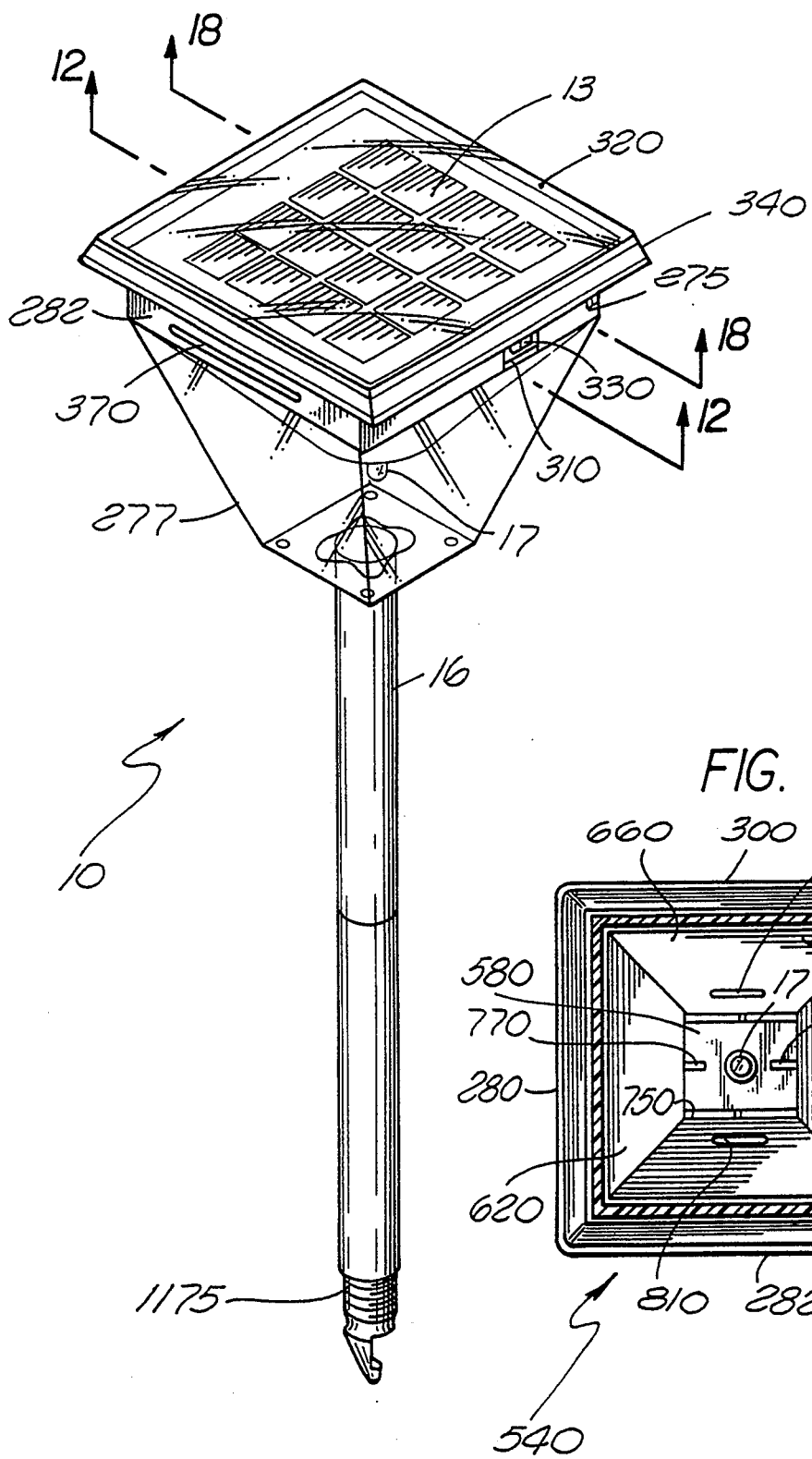

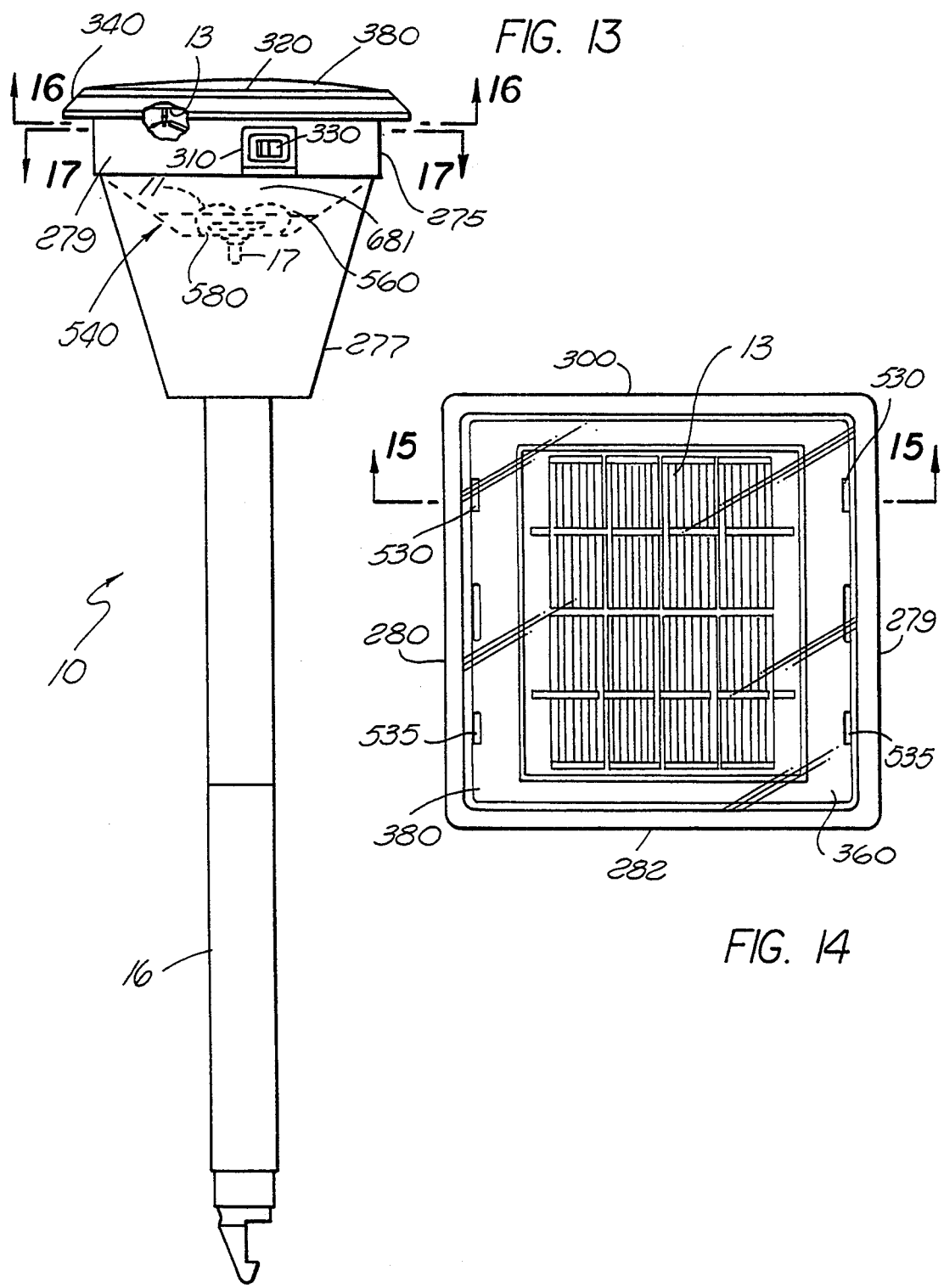

SELF-CONTAINED SOLAR POWERED LAMP

RELATED APPLICATIONS

This patent application is a continuation of application Ser. No. 07/622,455, filed on Dec. 5, 1990, for "SELF-CONTAINED SOLAR POWERED LAMP," now abandoned, which is a continuation-in-part of patent application Ser. No. 07/392,694, filed on Aug. 11, 1989, for "SELF-CONTAINED SOLAR POWERED LAMP," now U.S. Pat. No. 5,062,028.

FIELD OF THE INVENTION

This invention relates generally to lighting devices and more particularly to a solar powered lamp. More specifically, the invention relates to a solar powered lamp which is configured to function efficiently at elevated temperatures, by providing an increase in the acceptance of charge at elevated temperatures and flow of air through the lamp in order to control the temperature. The invention also relates to a solar powered lamp which is configured to assemble and disassemble with ease.

BACKGROUND OF THE INVENTION

Electrically powered outdoor lighting systems are used to illuminate pathways, yards, parks and other like areas. Commonly, such lights are connected to public utility systems, or similar sources of electrical power and are controlled by preset timing devices, to illuminate desired areas at nightfall and automatically turn off at a predetermined time, for example, prior to daybreak.

Many conventional lighting devices require extensive cabling, suitable timing mechanisms and the like, and are thus relatively expensive to install and maintain. In addition, such lighting devices utilize electric power generated in a conventional manner such as by burning fossil fuels. Burning of fossil fuels contributes to contamination of the environment and depletion of existing fuel resources.

Lighting devices which utilize solar energy and do not operate off a public utility source of power or the like, have proved to be a viable and desirable alternative. Solar lighting devices are desirable because they are relatively inexpensive and require hardly any maintenance.

Existing solar lighting devices have a self-contained electrical storage device which is maintained in a charged condition by a solar cell array. The solar cell array provides current at a required voltage to charge an electrical storage device during the day. Illumination is provided by supplying charge from an electrical storage device to an electrical light source such as a light bulb at night when the solar cell array is not producing electricity. The charging current supplied to the electrical storage device is controlled by the sunlight intensity and the size and efficiency of the solar cell array. Such solar lighting devices, although known to perform satisfactorily at normal temperatures, deteriorate in performance at elevated temperatures.

Generally, such solar lighting devices include electrical storage devices which function at their optimum at a specified operating temperature. At this temperature, the electrical storage device accepts all of the charge produced by the solar cell array. Commonly, in such devices, the electrical storage device is disposed in close proximity to the solar cell array to allow charge to be easily and efficiently transferred from the solar cell array to the electrical storage device. In such an arrangement, since the electrical storage device is in heat transfer proximity to the solar cell array, heat generated by the solar cell array causes the electrical storage device to become undesirably hot, thus, elevating its temperature beyond the operating temperature specified by the manufacturer. At temperatures higher than the operating temperature, the charge acceptance capabilities of the electrical storage device decrease substantially. This is undesirable because sunlight to power the solar cell array is available only during a relatively short period of time each day. The current level generated by the solar cell array when in excess of the charge acceptance of the electrical storage device causes it to overheat and sustain damage, thereby causing the overall performance of the solar powered lamp to deteriorate.

In one approach to overcome this problem, the electrical storage device may be arranged remote from the solar cell array. Although this prevents the electrical storage device from absorbing heat generated by the solar cell array, thus, maintaining the operating temperature at a normal level in hot weather, it is not satisfactory during cold weather because the electrical storage device is unable to provide current sufficient to illuminate the bulb at temperatures below its operating temperature. The electrical storage device is therefore typically placed in heat transfer proximity to the solar cell array so that heat absorbed by the solar cell array on a sunny day helps elevate the temperature of the power source to its normal operating temperature even if the ambient temperature is low.

Moreover, existing solar lighting devices are configured in a manner which does not provide for the flow of air through the lamp. This further contributes to higher temperatures and inefficient performance at such temperatures.

Prior configurations of solar lighting devices comprise a plurality of parts which are held together In an arrangement such that they are easily dislodged during use and are difficult and time-consuming to reassemble or repair.

A need thus exists for a solar powered lamp which functions more efficiently at elevated temperatures. A need also exists for a solar powered lamp which can be assembled securely and disassembled with ease.

SUMMARY OF THE INVENTION

Briefly, the present invention provides a solar powered lamp configured to function more efficiently at elevated temperatures. The solar powered lamp comprises a solar cell array disposed within an upper portion for producing electricity and an electrical storage device disposed within a component tray for accepting charge from the solar cell array. The component tray is arranged in heat transfer proximity to the solar cell array. The electrical storage device generates electricity which is supplied to an electrical light source for providing illumination.

In one aspect of the invention, the electrical storage device features an increased acceptance of charge produced by the solar cell array, at elevated temperatures.

In another aspect of the invention, the electrical storage device is spaced from the solar cell array by an amount sufficient to provide a flow of air between the solar cell array and the electrical storage device in order to prevent convective heating of the air surrounding the electrical storage device and to keep it from overheating. At the same time this configuration maintains an efficient transfer of charge from the solar cell array to the electrical storage device. Openings are provided in the component tray and upper portion to produce the flow of air through the solar powered lamp. A lens structure disposed about the light source also has openings which allow air to enter the lamp and move in an upward direction.

In still another aspect of the invention, the upper portion has inwardly and upwardly directed louver-type members extending from its inner surface, adjacent the openings provided in the upper portion to prevent moisture from entering the component tray.

In yet another aspect of the invention, the solar powered lamp is configured such that a top lens is securely but easily retained within the upper portion to provide easy access to the electrical storage device for ease of assembly and service.

In another aspect of the invention, the lens structure is formed as an integral unit and configured to securely retain the component tray at its upper end. The lens structure has latching members securely retained within recesses formed in the upper portion to provide an assembly which is a stable assembly but is easily disassembled when necessary to provide access to the component tray and light source. The lens structure also has a protrusion at its lower end which is threaded about its exterior periphery for attachment of a mounting stake to the lens structure during assembly.

These as well as other features of the invention will become apparent from the detailed description which follows, considered together with the appended drawings.

BRIEF DESCRIPTION OF THE DRAWINGS

One preferred embodiment and an alternative embodiment of the present invention is illustrated in and by the following drawings in which like reference numerals indicate like parts and in which:

FIG. 2 is an exploded view showing the various component parts of the structure as illustrated in FIG. 1;

FIG. 3 is a cross-sectional view of the bezel taken along line 3—3 of FIG. 2;

FIG. 4 is a cross-sectional view of the cover taken along line 4—4 of FIG. 2;

FIG. 8 is a top plan view of the component assembly tray with the component's position therein;

FIG. 9 is a bottom plan view of the component tray of FIG. 8;

FIG. 10 is a cross-sectional view of the component tray shown in FIG. 9 taken along line 10—10 thereof;

FIG. 11 is a perspective view of an alternative embodiment of the solar powered lamp of the present invention;

FIG. 12 is a cross sectional view taken along line 12—12 of FIG. 11, showing a projecting portion of the component tray which contains an electrical storage device. FIG. 12 shows openings formed in a lower surface of the component tray to provide a flow of air about the electrical storage device;

FIG. 13 is a front elevational view of the solar powered lamp of the present invention shown in FIG. 11, showing in phantom the projecting portion of the component tray;

FIG. 14 is a top plan view of the solar powered lamp of the present invention shown in FIG. 11 showing an upper portion of the solar powered lamp within which a solar cell array is encapsulated;

DETAILED DESCRIPTION OF THE PREFERRED EMBODIMENT

Figure 1:
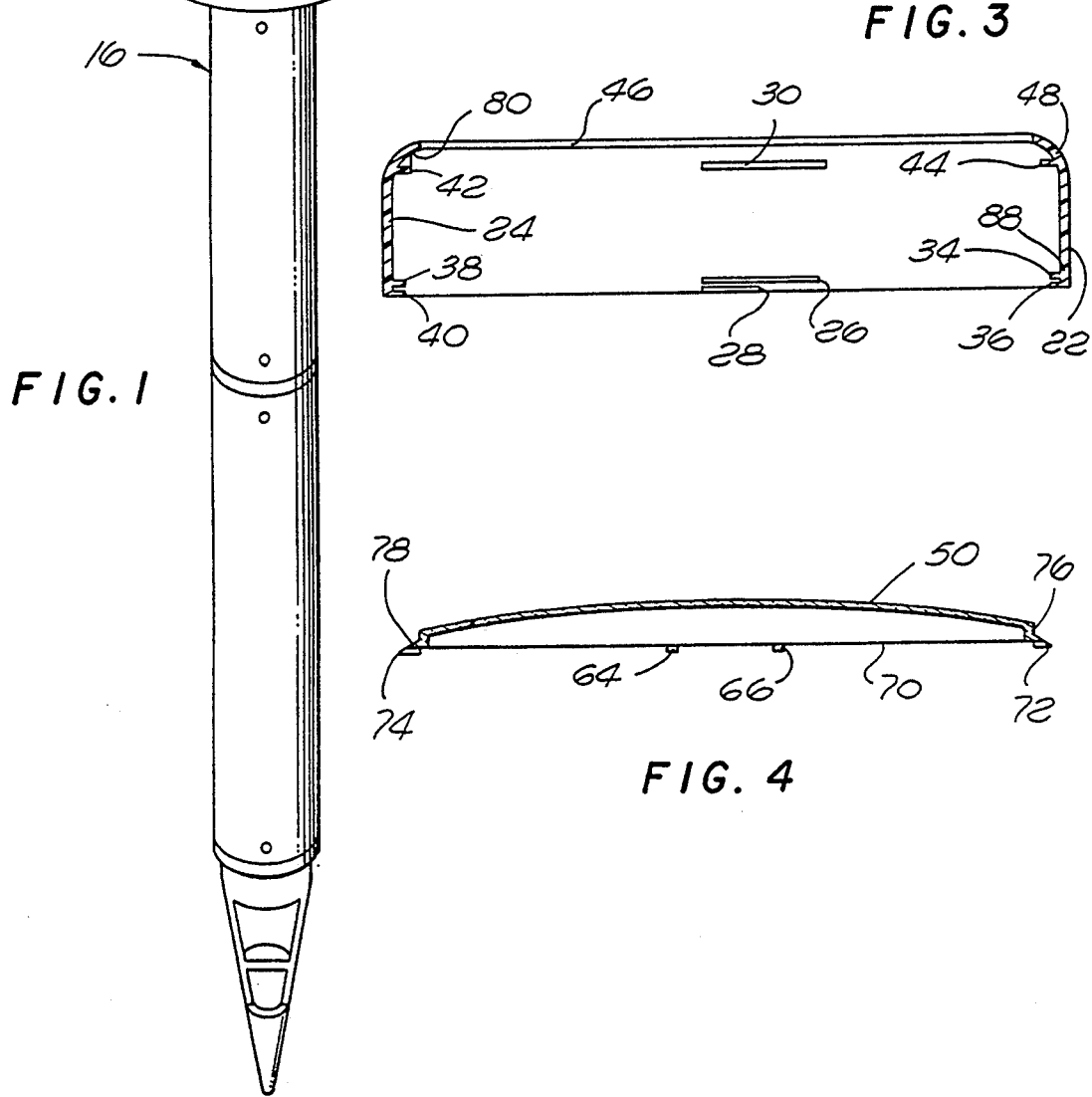
FIG. 1 is a perspective view showing one embodiment of a solar powered lamp constructed in accordance with the principles of the present invention.

FIG. 1 illustrates generally a solar powered lamp 10 which is a stand alone lamp which includes a self-contained electrical power source or electrical storage device 11 (shown in FIGS. 8 and 17), such as a high temperature battery; which is maintained in a charged condition by a solar cell array 13 and includes an electrical circuit 15 (shown in FIGS. 8 and 17) which controls application of electrical power to an electric light source 17 (shown in FIGS. 10 and 13), such as a light bulb, contained therein. The electrical power from the electrical storage device 11 is supplied to the light source 17 when the solar cell array 13 is not producing electricity, that is, when the ambient light falls below a predetermined level. The solar powered lamp 10 of the present invention is configured to provide a high acceptance of charge at elevated temperatures and flow of air. In addition, the solar powered lamp 10 is configured to be assembled and disassembled with ease.

The lamp 10 includes a top or upper portion 12 having a lens 14 affixed thereto. A stake 16 is, in turn, attached to the lens 14 and is used to position the lamp 10 in the desired area such, for example, as by inserting the stake 16 into the earth. A solar cell assembly 18 is retained within the top portion 12. In one embodiment of the present invention, decorative disks 20 are retained upon the lens 14. The entire lamp assembly 10, as illustrated in FIGS. 1 and 11, may be moved from place to place and positioned at any particular point which may be desired for any particular application. For example, a plurality of the lamps 10 may be positioned to illuminate a pathway as well as to delineate the same. In addition, such a plurality of lamps 10 may be placed to illuminate a given area during nighttime hours.

By reference to FIGS. 2–10, a more detailed understanding of the structure of the lamp 10, in accordance with one embodiment, may be obtained. The upper portion 12 of the lamp includes a bezel 22 which is preferably constructed of a molded plastic, such as ASA (acrylic styrene acrylonitrile) or the like, which is sturdy yet somewhat flexible for the purposes to be described below.

The bezel 22 having an upper part 48 and a lower part 88 defines an inner surface 24 from which there inwardly extends a plurality of spaced apart latching ribs shown at 26 and 28. Similar ribs, such as those illustrated at 26 and 28, are angularly disposed about the inner surface 24 of the bezel 22. Preferably, the latching ribs are disposed at 90° intervals about the surface 24, however, they may be disposed at different angular positions such as 120° or 60° depending upon the number desired. Also inwardly directed from the surface 24 are plurality of snap lock retainers as shown at 30. Again, such snap lock retainers are angularly disposed about the surface 24 and preferably at 90° intervals although other intervals may be utilized as desired.

The bezel 22 also defines an upper opening 32 within which the solar cell array 13 is disposed to receive the sunlight during daylight hours to charge the electrical storage device 11 contained within the light. The details of construction of the bezel 22 may be better understood by reference to FIG. 3 which more clearly shows the position and relationships of the latching ribs and the snap lock retainer. As is therein shown, additional latching ribs 34, 36, 38 and 40 are shown extending inwardly from the inner surface 24 of the bezel 22. Additional snap lock retainers 42 and 44 are also illustrated. As is more clearly shown in FIG. 3, the snap lock retainer 30 is displaced downwardly from the edge 46 of the bezel which defines the opening 32. As will be described more fully hereinafter, such spacing permits the solar cell assembly 18 to be snapped into place within the bezel 22 and securely held there.

By reference, again, to FIG. 2 and also to FIG. 4, there is illustrated a cover or top lens 50 which fits over the solar cell array 13 and which forms a part of the solar cell assembly 18. The cover 50 is optically clear and is preferably constructed of a polycarbonate plastic material which is impact resistant. The polycarbonate material thus protects the solar cell array 13 from incidental contact and also from dust. As is shown, the cover 50, at its outer rim 52, includes a plurality of lugs as shown at 54, 56 and 58. Each of the lugs includes spaced apart protrusions as shown at 60 and 62 with respect to the lug 56. Again, the lugs are angularly disposed about the cover 50 and preferably at 90° spacing to match the spacing of the snap lock retainers 30 formed on the bezel 22. The protrusions 60 and 62, when the cover 50 is positioned in place within the bezel 22, are spaced one on each side of a snap lock tongue formed on the solar cell assembly 18 such, for example, as shown at 68 and to be described more fully below. As is more clearly shown in FIG. 4, the protrusions 64 and 66 extend below the lower rim 70 of the cover 50. Further protrusions are shown at 72 and 74 and are those associated with the lugs 54 and 58 respectively. The general curvature of the cover 50 is also further and better illustrated in FIG. 4. As is also shown in FIG. 4, the cover 50 includes a step 76 in the periphery thereof. The step 76 fits within the opening 32 and conforms to the upper edge 46 of the bezel 22. The step 76 terminates in a ledge 78 which snugly mates against the upper portion 80 of the inner surface 24 of the bezel 22.

The solar cell assembly 18, along with the cover 50, are assembled together and snapped into the bezel 22. Additional locking tongues 84 and 86 displaced 90° from the tongue 68 are illustrated and an additional locking tongue, not shown, is disposed 180° from the tongue 68. As with the other protrusions, latching ribs and the like, the angular displacement of the locking tongues may be any desired. In any event, the displacement is such that the locking tongues on the solar cell assembly 18 mate with the snap lock retainers 30, 42 and 44 on the inner surface 24 of the bezel For assembly, the cover 50 is placed so that the protrusions 60 and 62 fall outside the tongue 68, thus securely and snugly fitting the cover over the solar cell assembly 18. The combination is then inserted into the bezel 22 and the locking tongues 68, 84 and 86 are snapped into place in the space provided between the upper edge 46 and the snap lock retainers 30, 42 and 44 at the upper part 48 of the bezel 22. The ability to snap the combination of the cover 50 and the solar cell assembly 18 into place is provided by the flexibility of the molded plastic forming the bezel 22.

As best shown in FIGS. 8 and 10, a component tray assembly 90 is provided to receive a high temperature battery 92, which functions more efficiently at elevated temperatures in a manner described in greater detail below and electrical circuit assembly 94 and light source 17 in a central aperture 96. The tray 90 is interconnected by electrical wires 98 and 100 to the solar cell assembly 18 so that electrical power may be provided from the solar cell array 13 to the battery 92 to maintain the same in a charged condition. The battery also, through the provision of the circuit assembly 94 provides electrical power to the light source 17 when the solar cell array 13 is not generating electrical energy. The component tray assembly 90 includes notches 102, 104, 106 and 108 which are used to locate the component tray assembly 90 within the space between the spaced apart latching ribs 26, 28, 34, 36, 38 and 40. The tray 90 may then be rotated and secured in position at the bottom part 88 of the bezel 22. The lower surface of the component tray assembly 90 then closes the bottom of the bezel 22 to provide a completed assembly.

The lens 14 includes outwardly extending latching fingers 110, 112, 114 and 116. Such fingers are inserted within openings as shown at 118 and 120 and the lens 14 is rotated appropriately to latch the same in place so as to extend downwardly from the component tray assembly 90. The disks 20 are assembled upon the outer surface of the lens 14 by slipping the openings as illustrated at 152 and 154 over outwardly extending sectors 122 and 124 and then rotating the disks so that they occupy the space between the sectors 122 and 124 and the stops 126 and 128 associated with the sector 122 and the stops 130 and 132 associated with the sector 124.

The stake 16 is assembled by inserting the body portions 134 and 136 over the central coupling 138 and securing the same by the use of screws inserted into the openings as illustrated at 140 and 142. Similarly, the tip 144 may be inserted into the bottom of the body portion 136 and secured in place by a screw positioned within the opening 146. The entire assembly is then inserted over a protrusion 148 provided at the bottom of the lens 14 and held in place by a screw inserted through the opening 150 in the body portion 134 of the stake 16. Obviously, if such is desired to cause the lamp 10 to extend a lesser distance from the surface, the coupling 138 and the body portion 136 may be discarded.

Figure 5:
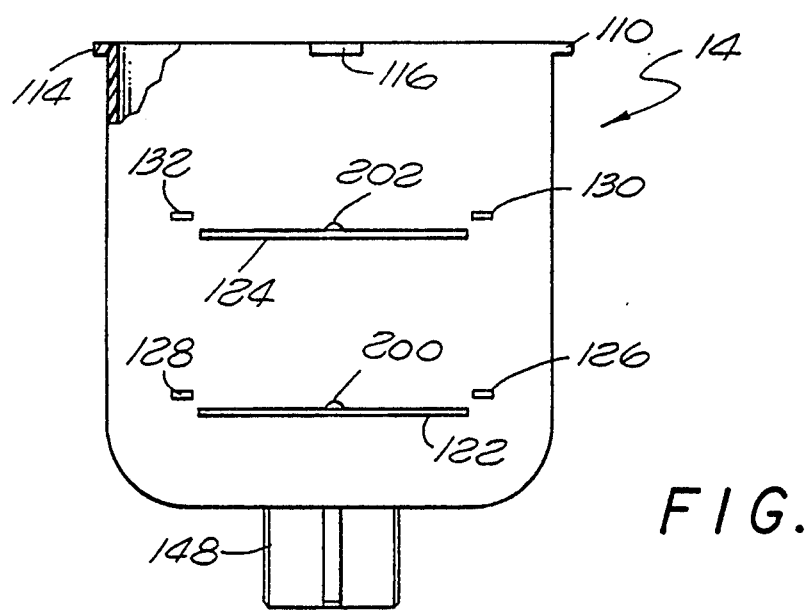
FIG. 5 is a plan view of the lens for the lamp.
Figure 6:
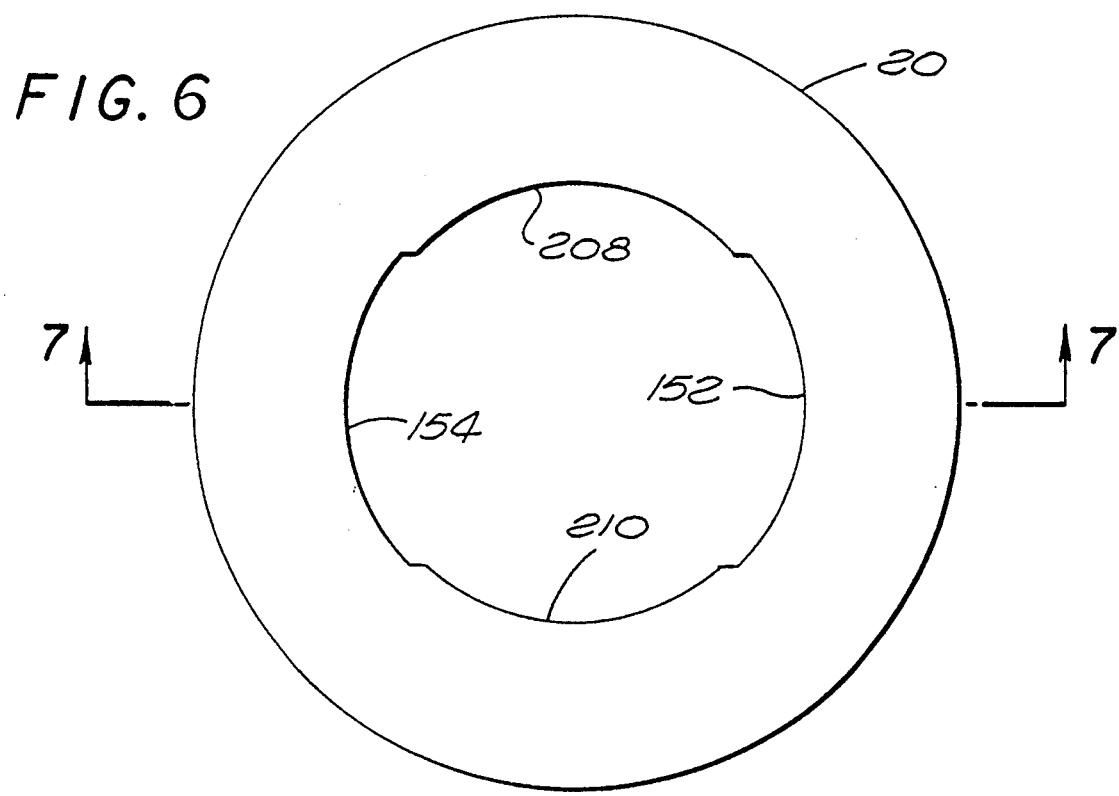
FIG. 6 is a top plan view of a decorative disk.
Figure 7:
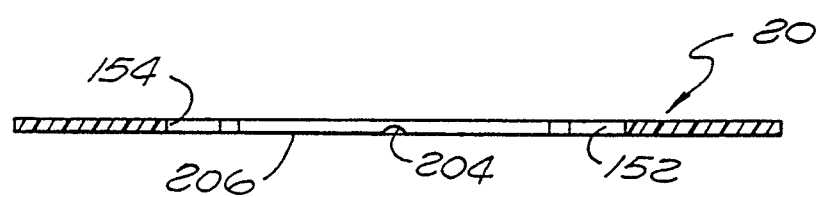
FIG. 7 is a cross-sectional view of the disk illustrated in FIG. 6 taken along line 7—7 thereof.

By reference now more particularly to FIGS. 5 through 7, there is illustrated in further detail the lens 14 and the disks 20 and the relationship therebetween which enable easy assembly thereof. As is shown particularly in FIG. 5, the sectors 122 and 124 contain protrusions 200 and 202 extending upwardly therefrom. The disk 20 includes a recess or detent 204 formed in the lower surface 206 thereof. When the disks 20 are to be assembled upon the lens 14, the disks are oriented so that the openings 152 and 154 are aligned with a sector 122. The openings 152 and 154 are sufficiently large enough so that the disk will easily pass not only the sector 122 but also the stops 126 and 128. The disk is then positioned such that it is disposed in the space provided between the sector 124 and stops 130–132. It will be obvious to those skilled in the art that there are counterparts to the sectors and stops on the opposite side of the lens 14 as viewed in FIGS. 2 and 5. Once the disk 20 is positioned in place as above described, it is rotated approximately 90° so that innermost portions 208 and 210 of the disk 20 are disposed in the space provided between the sector 24 and the stops 130–132. Rotation is continued until the detent 204 receives the protrusion 202. At this point, the disk is locked in position and cannot easily be displaced without applying substantial force thereto. By utilization of the protrusion 202 and detent 204, the disk is securely fastened on the lens 14 without the necessity of application of undue stress thereto. The additional disk 20 is positioned upon the lens 14 and secured in place in a similar manner as that just described, but with respect to the sector 122 and the stops 126–128 and their counterparts on the opposite side of the lens 14.

Referring now more particularly to FIGS. 8 through 10, the component tray assembly 90, with the various components contained thereon, is illustrated in greater detail. As is therein shown, the battery 92 is supported within a battery container compartment 220. Attached to the compartment are appropriate contacts 222 and 224 to receive electrical wires 226 and 228, respectively, to be connected to the circuit board 94 which contains the appropriate electrical circuit to control the application of power to the battery for charging, or from the battery to the light source 17 to illuminate the same. The circuit board 94 is retained upon the component tray 90 by clips 230, 232, 234 and 236 which are molded as part of the tray 90. The circuit board 92 may simply be pressed into place and held by the clips 230 through 236. Appropriate electrical leads 238 and 240 extend from circuit board 94 to the electric lamp bulb 17 which is appropriately supported within the opening 96.

Also extending from the upper surface of the component tray assembly 90 are spare bulb holders 242 and 244.

In addition to the openings 118 and 120, there are also provided similar openings 246 and 248. The openings 118, 120, 246 and 248 are designed to receive the latching fingers 110 through 116 formed on the upper edge of the lens 14. To assemble the lens 14 into the component tray 90, the fingers 110 through 116 are inserted into the large portion of the openings 118, 120, 246 and 248 and then rotated clockwise as viewed in FIG. 8 so that the lugs are secured in place. As is more clearly illustrated in FIG. 10, the central portion 250 is positioned more toward the right than is the outer section 252 of the tray 90. There is thus a spacing within the openings to permit the fingers to be received through the openings and, after rotation, to be held in place on the component tray 90.

As is more clearly shown in FIGS. 9 and 10, an outer periphery 254 of the outer portion 252 of the tray has the notches 102 through 108 defined therein. Extending from the notches in a counter-clockwise direction, as viewed in FIG. 9, are reduced thickness areas 256, 258, 260 and 262. The reduced thickness areas 256 through 262 may be viewed as blades defined by the outer periphery 254 which are utilized to secure the component tray 90 to the bezel 22. To accomplish such securement, the notches 102 through 108 are aligned in such a way that the component tray 90 slips past the latching ribs 28, 36 and 40 and the tray rests against the latching ribs 26, 38 and 34. The component tray 90 is then rotated in a clockwise direction to cause the blades 256 through 262 to be secured in the space between the latching ribs 26, 28, 34 and 36, and 38 and 40, as well as the additional pair of latching ribs disposed 180° from the latching ribs 26 and 28. In this manner, the component tray 90 is securely held in place at the bottom of the bezel 22 and, as above indicated, closes the bottom surface of the bezel.

As can be clearly seen, the self-contained solar powered lamp 10 of the present invention may be readily and easily assembled by merely placing the various components in their respective positions, snapping the solar cell assembly 18 and the cover 50 in place, rotating the component tray assembly into a locking position, placing the disks 20 upon the lens and then securing the lens 14 by placing the latching fingers within the required openings and rotating the same in a clockwise direction. Thus such clockwise rotation of each of the components will lock the various components in position, thus completing the assembly of the solar powered lamp 10, after which the stake 16 may be attached and the lamp disposed in the desired position.

FIGS. 11 through 21 illustrate an alternative embodiment of the present invention. Referring to FIGS. 11, 13, 14, 15, 16, 18 and 19, the lamp 10 comprises an upper portion 275 having a lens 277 affixed thereto. The stake 16 used to suitably position the lamp 10 in a desired location is suitably attached to the lens 277.

The upper portion 275 in an exemplary embodiment is preferably rectangular, comprising four vertical intersecting walls, front and rear walls 279 and 280, respectively, and opposing side walls 282 and 300. The upper portion 275 in the illustrated embodiment is preferably constructed from a suitable material such as ABS, high temperature Mitsubishi TS-30. The front wall 279 has an opening 310 surrounding a switch 330, of conventional design.

Figure 15:
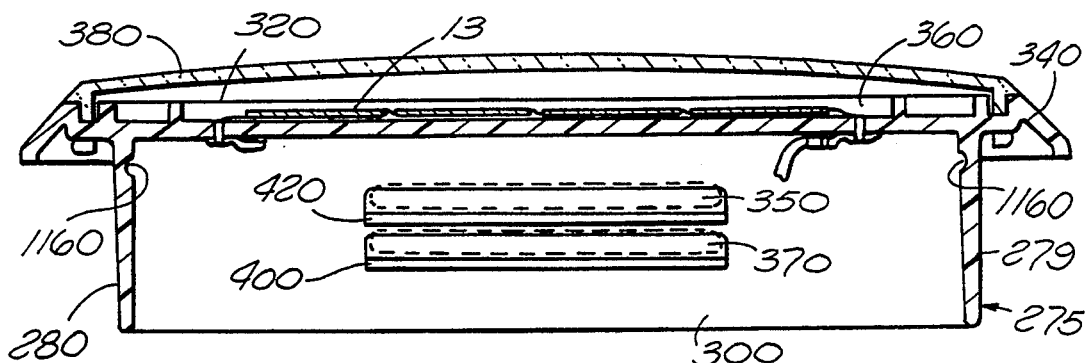
FIG. 15 is a cross sectional view taken along line 15—15 of FIG. 14, showing in phantom elongated slots formed in vertical walls of the upper portion and corresponding inwardly and upwardly directed louver-type members extending from an inner surface of the vertical walls.
Figure 16:
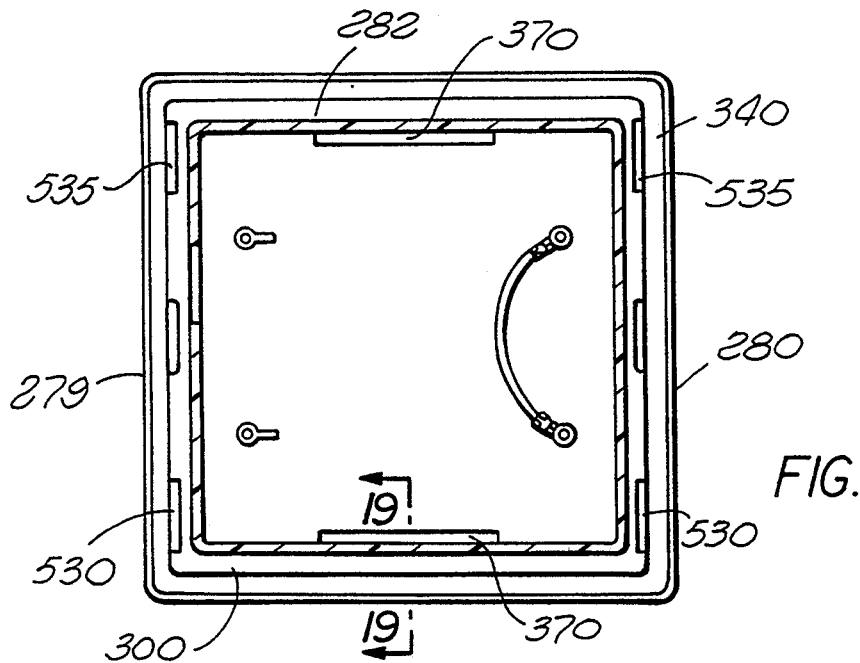
FIG. 16 is a bottom plan view of the upper portion shown in FIG. 14.
Figure 19:
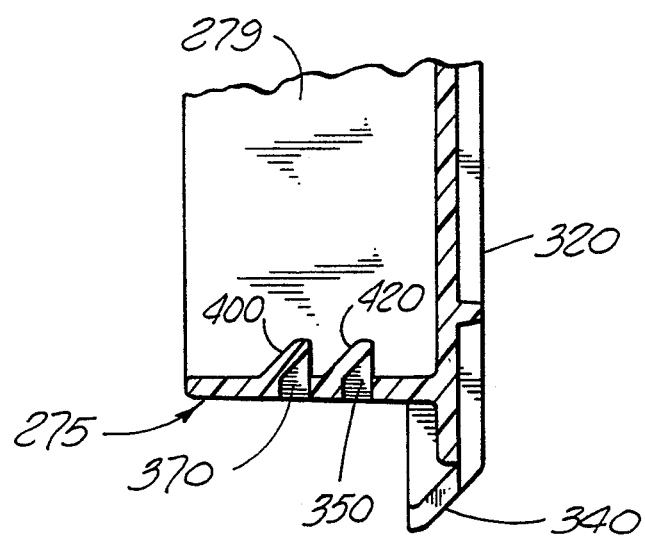
FIG. 19 is a cross sectional view taken along line 19—19 of FIG. 16, showing the louver-type members.

As best shown in FIGS. 15 and 19, the opposing side walls 282 and 300 have two elongated slots 350 and 370 (shown in phantom in FIG. 15) centrally disposed in parallel alignment. The elongated slots 350 and 370 are provided to allow air from within the upper portion 275 to exit into the atmosphere. Also, inwardly and upwardly directed from the inner surface of each of the opposing side walls 282 and 300, at the same location where the slots 350 and 370 are provided, two substantially identical, slated louver-type members 400 and 420 are provided. In the event of rain or the like, the louver-type members 400 and 420 advantageously prevent moisture from entering into the upper portion 275.

The upper portion 275 further comprises a roof 320 which at its outer extremity terminates in an inclined overhanging portion 340 extending beyond the vertical walls 279, 280, 282 and 300. As best shown in FIGS. 14 and 15, the roof 320 defines an upper opening 360, within which the solar cell array 13 is disposed to receive the sunlight during daylight hours to charge the electrical storage device 11 contained within the lamp 10. A top lens 380 fits over the solar cell array 13. The top lens 380 is preferably optically clear and is constructed of a polycarbonate plastic material which is suitably impact resistant. As mentioned before, by using a polycarbonate material, the solar cell array 13 are advantageously protected from accidental contact, dust and the like.

Figure 18:
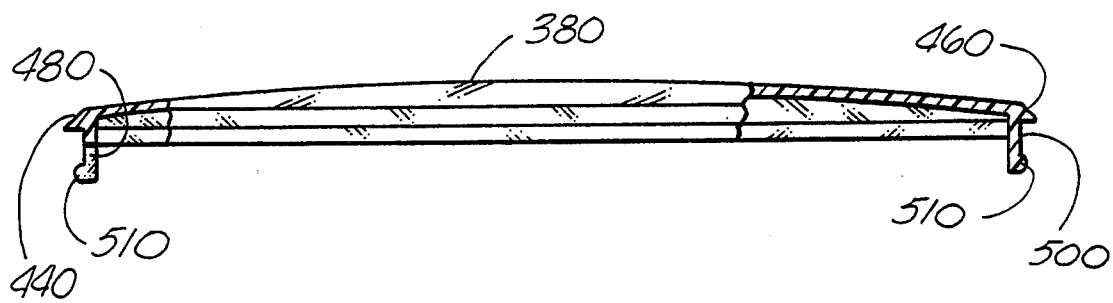
FIG. 18 is a cross sectional view taken along line 18—18 of FIG. 11, showing a top lens with downwardly extending locking fingers terminating in a lip portion.

The top lens 380 is configured to securely snap into place for ease of assembly. The top lens 380 is also easily removable providing convenient access to the solar cell array 13 and is easily assembled. As is best shown in FIG. 18, downwardly extending locking fingers 480 and 500, respectively, are disposed preferably at remote ends of each of sides 440 and 460 of the top lens 380. Each of the locking fingers 480 and 500 terminates in a protruding lip portion 510. The locking fingers 480 and 500 are inserted through openings 530 and 535 (shown in FIGS. 14 and 16) provided at corresponding locations in the portion of the roof 320 extending beyond the front and rear walls 279 and 280. The protruding lip portion 510 once snapped through the openings 530 and 535 securely and snugly retains the top lens 380 in position over the solar cell array 13. The ability to snap the top lens 380 in place is provided by the flexibility of the material. The lip portion 510 abuts against the lower periphery of the roof 320. Once snapped into place, the top lens 380 is securely retained in position, but can be easily removed when necessary, to gain access to the solar cell array 13 or to be replaced.

Figure 17:
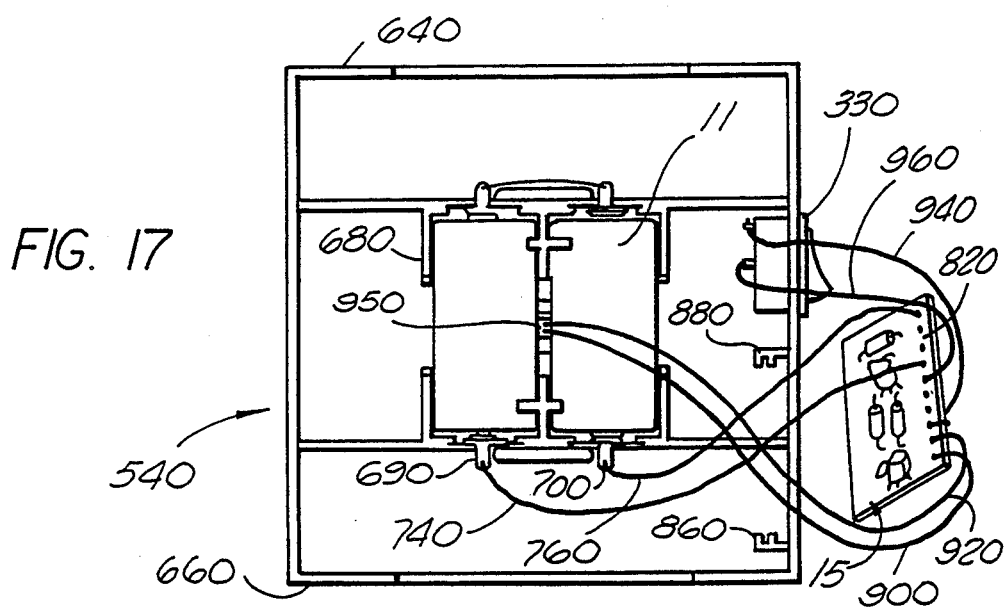
FIG. 17 is a cross sectional view taken along line 17—17 of FIG. 13, showing the electrical storage device centrally disposed within the component tray.

Referring now to FIGS. 12, 13 and 17, the upper portion 275 further comprises a component tray 540. The component tray 540 is provided to house the electrical storage device 11, the electrical circuit 15 and the light source 17. In the illustrated embodiment, the component tray 540 is preferably constructed from a suitable material such as ABS. As mentioned before, the component tray 540 is connected by electrical wires (not shown) to the solar cell array 13 so that electrical power is provided from the solar cell array 13 to the electrical storage device 11 to maintain the same in a charged condition. The electrical storage device 11 provides electrical power to the light source 17 when the solar cell array 13 is not generating electrical energy.

The component tray 540 comprises a projecting portion 560 which gradually tapers to a base extremity 580. The projecting portion 560 projects away from the solar cell array 13. The projecting portion 560 has inclined front and rear walls 600 and 620, respectively, and inclined opposing side walls 640 and 660, respectively. The electrical storage device 11 is supported within a container compartment 680, which is suitably constructed to securely retain the electrical storage device 11.

As best shown in FIG. 13, the electrical storage device 11 is spaced from the solar cell array 13 by an amount, indicated at 681, which provides an adequate air gap and is sufficient to provide flow of air between the two. Flow of air between the solar cell array 13 and the electrical storage device 11 helps disperse the heat discharged by the solar cell array 13. The air gap allows the heated air to rise and cooler air to flow through.

Thus, placing the electrical storage device 11 within the projecting portion 560 helps to alleviate the problem whereby the electrical storage device 11 absorbed heat discharged by the solar cell array 13.

Cooling is further provided by adequate ventilation in the lamp 10. Air is admitted within the component tray 540 through elongated openings 730 and 750 formed in the base extremity 580, adjacent side walls 640 and 660. The base extremity 580 also has openings 770 and 790, centrally disposed on either side of the light source 17. The side walls 640 and 660 have openings 810 and 830, respectively, in parallel alignment with the openings 730 and 750.

Attached to the container compartment 680 are appropriate contacts 690 and 700 to secure electrical wires 740 and 760, respectively, which are connected to a circuit board 820. The circuit board 820 contains the appropriate electrical circuit 15 to control the application of power to the electrical storage device 11 for charging, or from the electrical storage device 11 to the light source 17 for illuminating the same. The circuit board 820 is retained upon the component tray 540 by clips 860 and 880 which are preferably formed as part of the component tray 540. The circuit board 820 is easily secured into place and retained by the clips 860 and 880. Appropriate electrical leads 900 and 920 extend from the circuit board 820 to the light source 17 which is suitably supported within a central aperture 950. Suitable electrical leads 940 and 960 connect the circuit board 820 to the switch 330.

In a preferred embodiment, the electrical storage device 11 is a high temperature battery which has a preferred charge acceptance temperature greater than 25° C., for example of 35° C. The high temperature battery preferably has an adequate cycle life at high temperature and is a high temperature nickel-cadmium battery. Such batteries use a high temperature plastic separator and a special electrolyte that provides excellent high temperature charge acceptance without a decreased cycle life. At an operating temperature of 35° C., the high temperature accepts 100% of the charge produced by the solar cell array 13. At an elevated temperature of 45° C., the high temperature battery accepts between 75% to 80% of the charge produced by the solar cell array 13.

Figure 20:
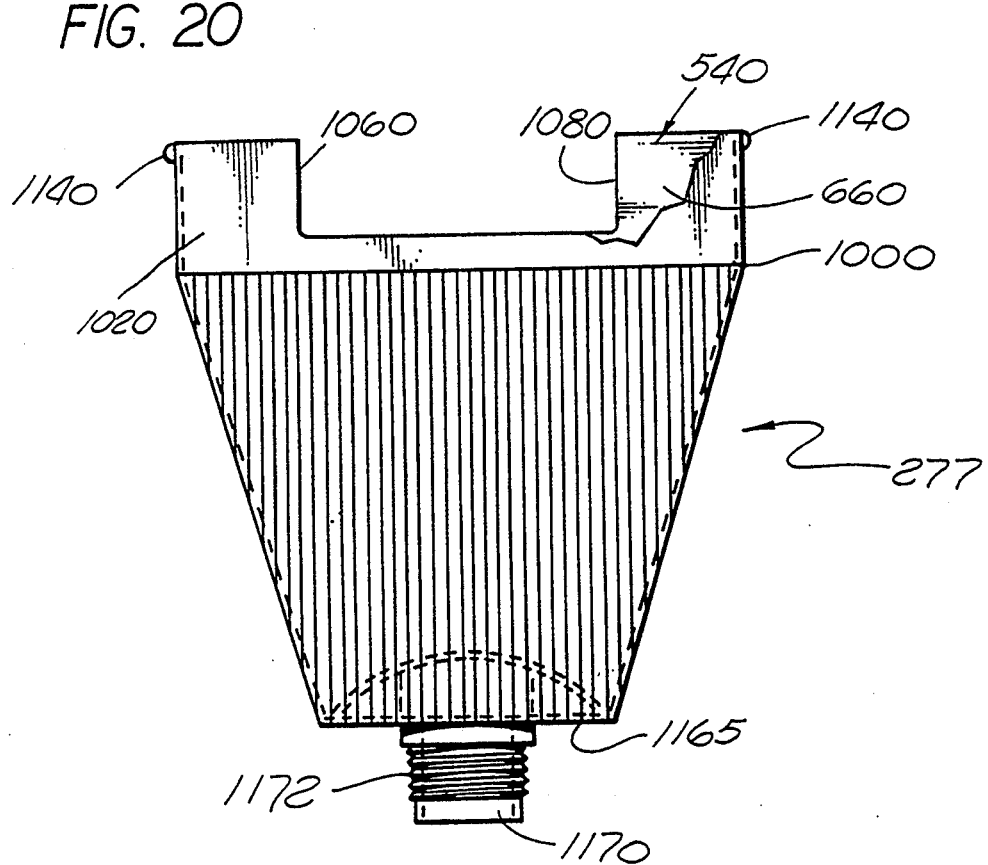
FIG. 20 is a side elevational view of a lens of the solar powered lamp shown in FIG. 11, showing a portion thereof cut away at an upper extremity of the lens and an externally threaded protrusion for securing a mounting stake.
Figure 21:
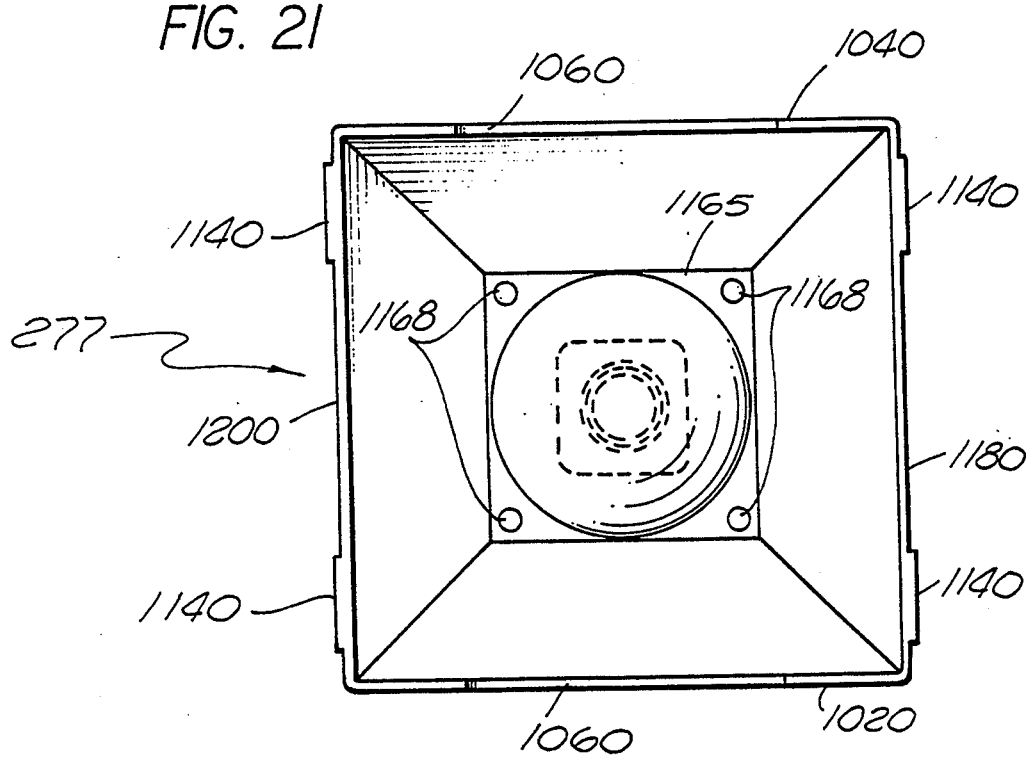
FIG. 21 is a top plan view of the lens structure shown in FIG. 20.

Referring now to FIGS. 20 and 21, the lens 277 is integrally molded from a suitable material such as plastic. In the illustrated embodiment, the lens 277 is formed from a clear polycarbonate. The lens 277 includes a lip 1000, formed along its inner periphery and spaced from its upper extremity, so that the component tray 540 firmly sits against the lip 1000. The lens 277 comprises side walls 1020 and 1040, each of which has a portion 1060 thereof, cut away to correspond to a portion 1080 of the side walls 640 and 660 of the component tray 540. The portions 1060 and 1080 are removed to facilitate flow of air within the component tray 540 and about the electrical storage device 11 in order to control the temperature.

At remote ends of front and rear walls 1180 and 1200, respectively, of the lens 277, are disposed latching members 1140 which are received and securely retained within corresponding recesses 1160 (best shown in FIG. 15) formed along the front and rear walls 279 and 280 of the upper portion 275. The lens 277, at its base 1165 comprises four apertures 1168 to allow air to enter and move in an upward direction toward the component tray 540.

The lens 277, at its base 1165 includes a protrusion 1170 which is threaded about its exterior periphery 1172. The stake 16 is preferably threaded about its interior (not shown) so that the stake 16 is easily and securely threaded and attached to the lens 277.

As shown in FIG. 11, the stake 16 includes an externally threaded tip 1175 such that it is easily coupled to a second stake. The externally threaded tip 1175 is inserted into the internally threaded periphery of the second stake. In this manner the solar powered lamp 10 is easily extended by a greater distance from the surface.

Although the invention has been described in terms of some preferred embodiments thereof, other embodiments that are apparent to those of ordinary skill in the art are also within the scope of the invention. Accordingly, the scope of the invention is intended to be defined only by reference to the appended claims.

What is claimed is:

1. A solar powered lamp, comprising:
   a solar cell array receiving sunlight and generating charge;
   an electrical storage device disposed in heat transfer proximity to said solar cell array, said electrical storage device being electrically connected to said solar cell array to accept charge from said solar cell array and apply said charge to illuminate an electrical light source connected to said electrical storage device, said electrical storage device accepting substantially all the charge generated by said solar cell array at a temperature of at least 35° C. without a decreasing cycle life of said electrical storage device, wherein when in use said solar powered lamp is designed to be charged and discharged on a daily basis.

2. A solar powered lamp as defined in claim 1, wherein said electrical storage device accepts at least 75% of the charge transferred from said solar cell array at a temperature greater than said 35° C.

3. A solar powered lamp as defined in claim 1, wherein said electrical storage device illuminates said light source when said solar cell array is not producing charge.

4. A solar powered lamp as defined in claim 1, wherein said electrical storage device is spaced from said solar cell array by a predetermined amount, said predetermined amount defining a path to allow flow of air between said electrical storage device and said solar cell array.

5. A solar powered lamp as defined in claim 4, additionally comprising:
   an upper portion, said solar cell array being disposed within said upper portion;
   a component tray having a projecting portion, said component tray arranged below said upper portion, said electrical storage device being disposed in said projecting portion, said projecting portion extending away from said solar cell array.

6. A solar powered lamp as defined in claim 5, wherein said upper portion has a top lens mounted thereon, said top lens having at least one locking finger which extends through at least one corresponding opening provided in said upper portion.

7. A solar powered lamp as defined in claim 6, wherein said locking finger terminates in a lip portion, said lip portion when inserted through said opening, abutting the lower periphery of said upper portion to retain said top lens in position.

8. A solar powered lamp as defined in claim 6, wherein said top lens is formed from an optically clear material.

9. A solar powered lamp as defined in claim 1, wherein said electrical storage device is a high temperature battery having a recommended charge acceptance temperature of 35° C.

10. A solar powered lamp as defined in claim 1, wherein said electrical storage device is a Nickel Cadmium high temperature battery.

11. A solar powered lamp comprising:
    a solar cell array receiving sunlight and generating charge, said solar cell array being disposed in an portion;
    an electrical storage device disposed in heat transfer proximity to said solar cell array in a projecting portion of a component tray arranged below said upper portion, said projecting portion extending away from said solar cell array, and comprising openings on a lower surface thereof, said openings allowing air flow into said projecting portion, said electrical storage device being electrically connected to said solar cell array to accept charge from said solar cell array and apply said charge to illuminate an electrical light source connected to said electrical storage device, said electrical storage device accepting substantially all the charge generated by said solar cell array at a temperature greater than 25° C., said electrical storage device spaced from said solar cell array by a predetermined amount, said predetermined amount defining a path to allow flow of air between said electrical storage device and said solar cell array.

12. A solar powered lamp comprising:
    a solar cell array receiving sunlight and generating charge;
    an electrical storage device disposed in heat transfer proximity to said solar cell array, said electrical storage device being electrically connected to said solar cell array to accept charge from said solar cell array and apply said charge to illuminate an electrical light source connected to said electrical storage device, said electrical storage device accepting substantially all the charge generated by said solar cell array at a temperature greater than 25° C. and illuminating said light source when said solar cell array is not producing charge; and
    a lens disposed about said light source, said lens having a plurality of openings which allow air to flow through said lens.

13. A solar powered lamp as defined in claim 12, wherein said openings are formed in a lower surface of said lens to allow air to flow in an upward direction within the lamp.

14. A solar powered lamp as defined in claim 12, wherein said lens is formed as an integral unit.

15. A solar powered lamp as defined in claim 14, wherein said lens is molded from a synthetic polymeric material.

16. A solar powered lamp as defined in claim 14, wherein said lens comprises at least one latching member, said latching member being received within a corresponding recess formed along an inner wall of an upper portion and securely retained within said recess.

17. A solar powered lamp as defined in claim 14, wherein said lens comprises a lip extending along its inner periphery and displaced from an upper extremity thereof, said electrical storage device being disposed within a component tray and said component tray being firmly seated against said lip.

18. A solar powered lamp as defined in claim 12, wherein said lens comprises a protrusion, said protrusion being threaded about an external periphery.

19. A solar powered lamp, comprising:
a solar cell array disposed within an upper portion and receiving sunlight and generating charge, said upper portion having intersecting walls defining a chamber therein for allowing air to exit from said chamber;
an electrical storage device spaced from said solar cell array by a predetermined amount, said predetermined amount defining a path to allow flow of air between said electrical storage device and said solar cell array said electrical storage device being disposed within a projecting portion of a component tray, arranged below said upper portion, said projecting portion extending away from said solar cell array, said electrical storage device being electrically connected to said solar cell array to accept charge from said solar cell array and apply said charge to illuminate an electrical light source connected to said electrical storage device, said electrical storage device accepting substantially all the charge generated by said solar cell array at a temperature greater than 25° C.

20. A solar powered lamp, comprising:
a solar cell array disposed within an upper portion and receiving sunlight and generating charge;
an electrical storage device spaced from said solar cell array by a predetermined amount, said predetermined amount defining a path to allow flow of air between said electrical storage device and said solar cell array, said electrical storage device being disposed within a projecting portion of a component tray arranged below said upper portion, said component tray having four intersecting walls, at least one of said walls having a portion thereof cut away to allow air to enter and exit therethrough, said projecting portion extending away from said solar cell array, Said electrical storage device being electrically connected to said solar cell array to accept charge from said solar cell array and apply said charge to illuminate an electrical light source connected to said electrical storage device, said electrical storage device accepting substantially all the charge generated by said solar cell array at a temperature greater than 25° C.

21. A solar powered lamp as defined in claim 20, wherein at least one of said walls has an inwardly and upwardly directed member extending from an inner surface thereof, said member being disposed proximate said opening to prevent moisture from entering said component tray.

22. A solar powered lamp, comprising:
an upper portion having a solar cell array disposed therein, said solar cell array receiving sunlight and generating charge;
a component tray arranged in heat transfer proximity to said upper portion, and electrical storage device disposed within a projecting portion of said component tray projecting away from said solar cell array and connected to said solar cell array to accept charge therefrom; and
a light source connected to said electrical storage device for acceptance of charge to illuminate said light source, said electrical storage device being spaced from said solar cell array by an amount which dissipates heat between said electrical storage device and said solar cell array and maintains an efficient transfer of charge between said solar cell array and said electrical storage device at a temperature of at least 35° C. without a decreasing cycle life, wherein when in use said solar powered lamp is designed to be charged and discharged on a daily basis.

23. A solar powered lamp, comprising:
a solar cell array receiving sunlight and generating charge; and
an electrical storage device disposed within a tray which is spaced from said solar cell array by a predetermined amount, said predetermined amount defining a path to allow flow of air between said electrical storage device and said solar cell array, said tray having openings on a lower surface thereof, said openings allowing air flow into said tray.

24. A solar powered lamp as defined in claim 23, wherein said electrical storage device is disposed in a projecting portion of said tray.

25. A solar powered lamp as defined in claim 23, further comprising:
a lens disposed about a light source, said electrical storage device applying charge to illuminate said light source, said lens having a plurality of openings which allow air to flow through said lens.

26. A solar powered lamp as defined in claim 25, wherein said openings are formed in a lower surface of said lens to allow air to flow in an upward direction within the lamp.

27. A solar powered lamp as defined in claim 25, wherein said solar cell array is disposed within an upper portion having walls defining a chamber for allowing air to exit from said chamber.

28. A solar powered lamp as defined in claim 27, wherein said lens comprises at least one latching member, said latching member being received within a corresponding recess formed along an inner wall of an upper portion and securely retained within said recess.

29. A solar powered lamp defined in claim 27, wherein said lens comprises a lip extending along its inner periphery and displaced from an upper extremity thereof, said electrical storage device being disposed within a component tray and said component tray being firmly seated against said lip.

30. A solar powered lamp as defined in claim 23, wherein said tray has at least one wall having a portion thereof cut away to allow air to enter and exit therethrough.

31. A solar powered lamp as defined in claim 30, wherein at least one of said walls has an inwardly and upwardly directed member extending from an inner surface thereof, said member being disposed proximate said opening to prevent moisture from entering said tray.

32. A solar powered lamp, comprising:
a solar cell array receiving sunlight and generating charge;
an electrical storage device electrically connected to said solar cell array to accept charge from said solar cell array and apply said charge to illuminate an electrical light source connected to said electrical storage device; and a lens disposed about said light source, said lens having a plurality of openings which allow air to flow through said lens.

33. A solar powered lamp, comprising:

a solar cell array receiving sunlight and generating charge, said solar cell array disposed within an upper portion having walls defining a chamber therein for allowing air to exit from said chamber; and an electrical storage device electrically connected to said solar cell array to accept charge from said solar cell array and apply said charge to illuminate an electrical light source connected to said electrical storage device.

34. A solar powered lamp as defined in claim 33, wherein said electrical storage device is disposed in a projecting portion of a component tray, said projecting portion extending away from said solar cell array.

* * * * *